April 2, 1963   G. C. CARRONA   3,084,241
ELECTRICALLY HEATED GARMENT
Filed Feb. 8, 1961   2 Sheets-Sheet 1

INVENTOR.
GENEVIEVE C. CARRONA

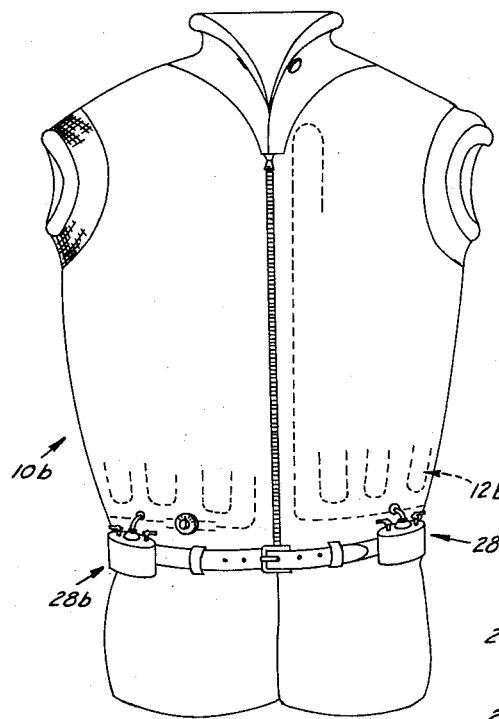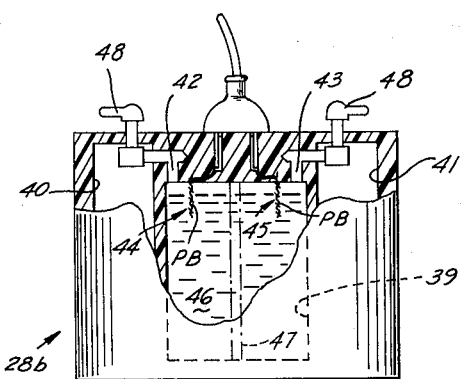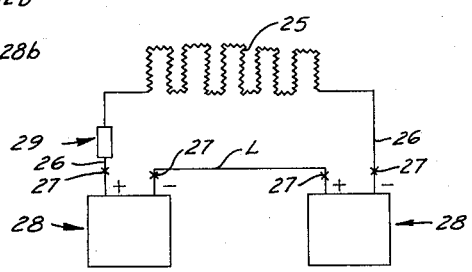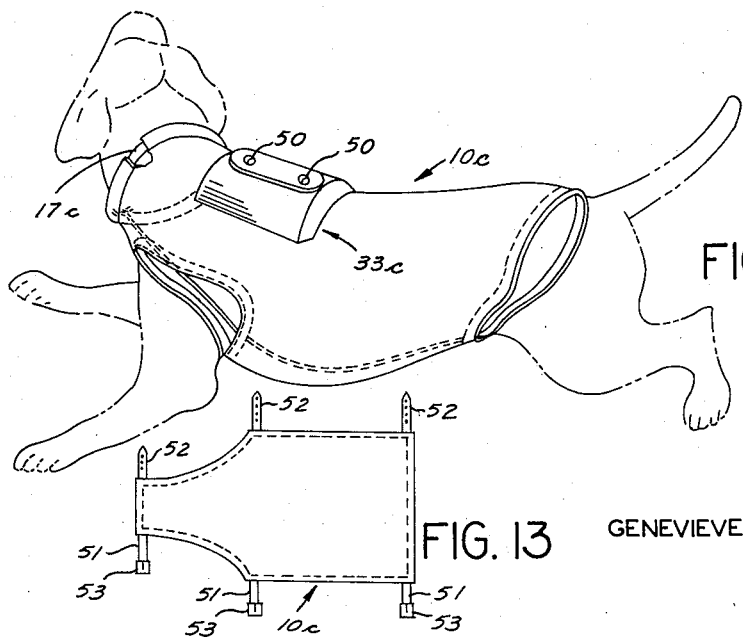

United States Patent Office 3,084,241
Patented Apr. 2, 1963

3,084,241
ELECTRICALLY HEATED GARMENT
Genevieve C. Carrona, 2316 Calle Chiquita,
La Jolla, Calif.
Filed Feb. 8, 1961, Ser. No. 87,932
15 Claims. (Cl. 219—46)

The present invention comprises an electrically heated garment including an electrically heated torso or trunk covering or enclosing means adapted to be fastened around at least a portion of a torso of a trunk of a human or animal and provided adjacent the inside thereof with electrically energizable heat-producing means extending over a substantial portion of the area thereof whereby to effectively heat the enclosed region immediately around the torso or trunk of the human or animal. In one preferred form of the invention the torso or trunk covering or enclosing means also includes an outer insulating member adapted to minimize heat loss from the region around the torso or trunk of the human or animal whereby to minimize the heating required by the heat-producing means in order to maintain a predetermined minimum temperature immediately around the enclosed or covered portion of the torso or trunk of the human or animal.

It should also be noted that, in one specific preferred form of the invention, the heat-producing means is provided with controllably adjustable thermostatic switch means positioned within the torso or trunk covering or enclosing means and electrically connected in circuit with an electric power supply means and the heat-producing means for controllably de-energizing said heat-producing means at a predetermined or controllably adjustable upper control temperature and for energizing said heat-producing means at a predetermined or controllably adjustable lower control temperature whereby to maintain the temperature within the torso or trunk covering and enclosing means around the torso or trunk portion of the human or animal within a predetermined or controllably adjustable minimum-to-maximum temperature range.

It should also be noted that, in one specific preferred form of the invention, the other flexible insulating member is provided on either the inner or outer side thereof, or effectively therein, with inwardly directed heat-reflecting means and/or other thermal insulation means having a low heat transmission characteristic.

It should also be noted that, in one specific form of the invention, the torso or trunk covering and enclosing means additionally includes an inner thin-sheet liner means positioned immediately inside of the heat-producing means and being substantially co-extensive with the outer insulating member and being joined thereto at suitable locations such as along edge portions thereof, or the like.

It should also be noted that, in one specific preferred form of the invention, the torso or trunk covering and enclosing means is provided with sealing edge portions or means defining exit apertures for extended torso or trunk portions of the body of a human or animal passing therethrough and extending beyond said exit apertures; said sealing portions being adapted for sealingly engaging such extended torso or trunk portions of the human or animal body whereby to inhibit heat loss through said exit apertures from the interior of the heated torso or trunk covering or enclosing means.

It should also be noted that, in one specific preferred form of the invention, electric power supply means (which, in certain forms, comprises "fuel cell" or battery means) is provided with means for removably electrically connecting same to said heat-producing means for electrically energizing same. Said connection is normally provided through the controllably adjustable thermostatic switch means.

In one specific form of the invention, the torso or trunk covering or enclosing means is provided with fastening means for fastening same in covering, enclosing, sealed relationship around at least a portion of a torso or trunk of a human or animal. In one specific animal blanket form of the invention, said fastening means comprises strap means provided with buckle means, various other mechanical fasteners, or the like.

In one specific form of the invention, the torso or trunk covering or enclosing means is provided with support means for removably carrying the electric power supply means. In one specific version of the heated animal blanket form of the present invention, said support means comprises pocket means preferably carried on the exterior of the torso or trunk covering or enclosing means. In another specific form of the present invention directed to a heated vest adapted to be worn by a human, said support means comprises belt means carried by the exterior of the garment and provided with attachment means for removably carrying said electric power supply means exterior of the garment.

In one specific form of the invention, the heat-producing means may comprise a flat thin-sheet base member of electrical insulating material and a similar cover member of electrical insulating material joined together and provided therebetween with heating element means comprising tortuous path, electrically resistive means provided with input means in electrically conductive relationship with said connection means for connection to said electric power supply means. In a preferred version of this form of the invention said base and cover members are preferably made of liquid-impervious material to prevent any moisture from inadvertently penetrating therethrough and possibly shorting out the electrically resistive means comprising the heat-producing means.

It is an object of the present invention to provide a novel electrically heated garment of the character referred to above which is of extremely simple, cheap, foolproof and highly effective construction such as to be conducive to widespread use of the device.

Further objects are implicit in the detailed description which follows hereinafter and will be apparent to persons skilled in the art after a careful study thereof.

For the purpose of clarifying the nature of the present invention, several exemplary embodiments are illustrated in the hereinbelow-described figures of the accompanying drawings and are described in detail hereinafter.

Figures 6, 8:
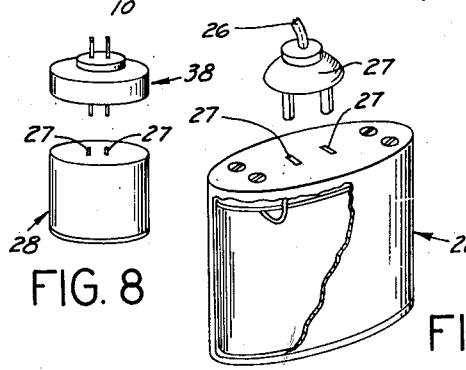
FIG. 6 is an enlarged perspective view (partially broken away and with the connection means in exploded relationship) of one of the power supply means comprising a battery, and is exemplary of both of them.

FIG. 8 is a fragmentary exploded view generally similar to FIG. 6, but illustrates the provision of an adaptor which effectively comprises rectifying means for interposition between the battery means and an electric outlet whereby to effectively charge the battery. Suitable voltage and/or current modification and/or control means positioned in circuit with the rectifying means may also be included in the adaptor means if desired, although not specifically shown, since such arrangements are well known in the art.

FIG. 9 is an electrical schematic drawing of a typical circuit arrangement of the power supply means, the controllably adjustable thermostatic switch means, and the heat-producing means.

Figures 1, 2:
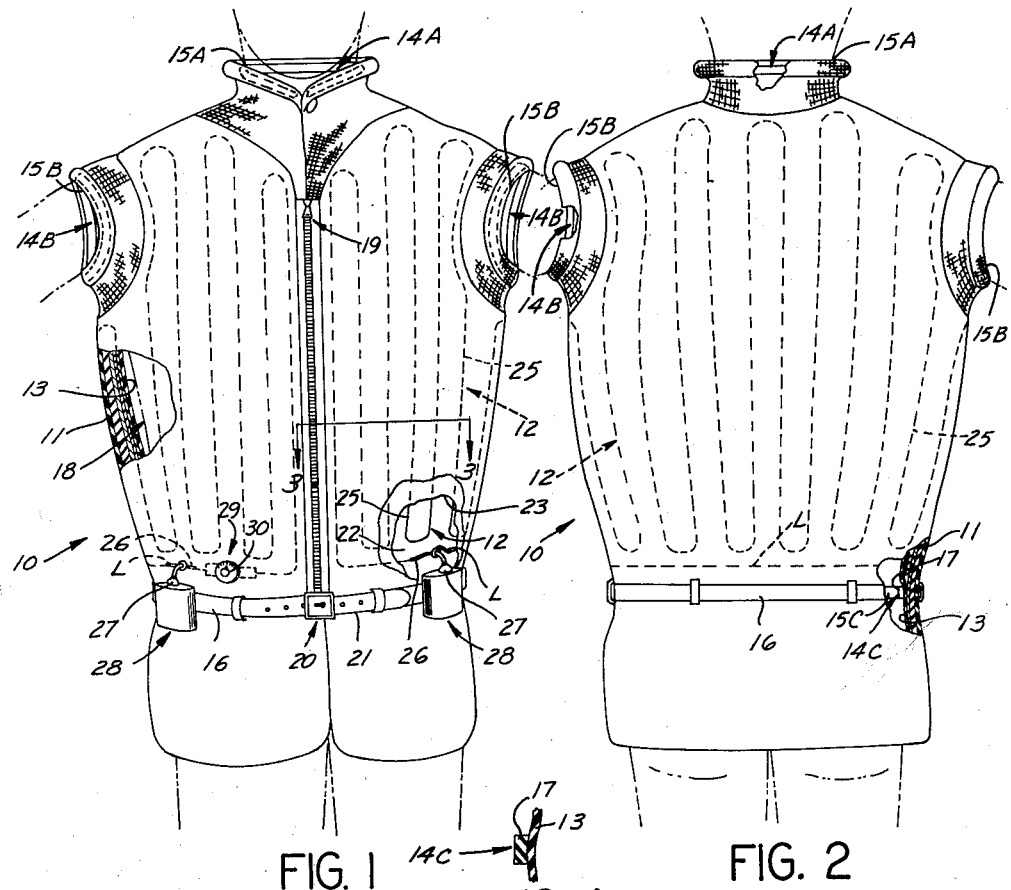
FIG. 1 is a front elevational view of one exemplary form of the present invention comprising a heated vest for cooperation with the torso of a person's body (shown fragmentarily in broken lines). Certain portions of the device are shown partially broken away in order to impart a better understanding of certain structural features of the invention.
FIG. 2 is a rear elevational view of the device shown in FIG. 1, also with certain portions partially broken away for reasons of drawing clarity.
Figures 3, 4:
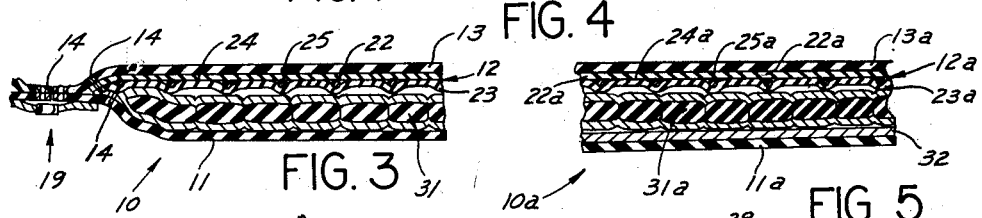
FIG. 3 is an enlarged fragmentary sectional view taken in the direction of the arrows 3—3 of FIG. 1.
FIG. 4 is an enlarged view of a part of the lower right hand, partially broken away and sectioned portion of FIG. 2 illustrating the waist-sealing means.

FIG. 10 is a view generally similar to FIG. 1, but illustrates the arrangement with a slightly modified form of power supply means comprising "fuel cell" means.

FIG. 11 is an enlarged, partially broken away and partially sectional view illustrating one typical exemplary fuel cell means in a generally diagrammatic way, it being understood that normally such "fuel cells" are very much smaller and a number of them would be arranged in stacked, series-connected arrangement.

FIG. 12 is a perspective view illustrating a slightly modified form of the invention comprising a heated garment for an animal—in this case a dog, although not specifically so limited.

FIG. 13 is a reduced-size plan view of the type of garment shown in FIG. 12 additionally or alternatively provided with fastening means comprising multiple strap portions and buckle means.

Referring to FIGS. 1–4, 6, and 7 for exemplary purposes, one illustrative embodiment of the invention takes a typical exemplary form wherein it comprises a flexible torso or trunk covering or enclosing means, such as is indicated generally at 10, including an outer flexible thin-sheet insulating member 11 effectively provided inwardly thereof with electrically energizable heat-producing means, indicated generally at 12, coextensive with a substantial portion of the inside surface area of the outer insulating member 11.

In the specific example illustrated, the garment also includes an inner flexible thin-sheet liner means 13 positioned immediately inside of said heat-producing means 12 and being substantially coextensive with said outer insulating member 11 and being joined thereto along edge portions, such as indicated at 14, whereby to define the torso or trunk covering and enclosing means 10 forming the heated garment.

In the specific example illustrated, the torso or trunk covering and enclosing means 10 comprising the garment is provided with sealing edge portions 14A at the neck aperture 15A, sealing means 14B at each of the shoulder apertures 15B, and effective sealing means 14C underlying the belt 16 surrounding the region of the lower waist exit aperture 15C. Each of these sealing means is of similar construction to that shown in detail at 14C and includes a resilient band of compressible effectively elastic material 17 adapted to resiliently engage the corresponding portion of a person's body whereby to inhibit heat loss outwardly through said apertures 15A, 15B, and 15C from the interior of the heated torso or trunk cover and enclosing means 10; said heated interior being indicated generally at 18.

The torso or trunk covering and enclosing means 10 is provided with fastening means for fastening same in covering and in closing sealed relationship around at least a portion of a torso or trunk.

In the specific example illustrated in FIGS. 1–4, said fastening means comprising the slide mechanical fastener commonly known as a "Zipper" fastener, indicated generally at 19, which is adapted to be slidably moved downwardly to open the two front portions of the torso or trunk covering and enclosing means 10 comprising the garment or to be slidably moved upwardly to effectively fasten same together. Also, the belt 16 is provided with a buckle 20 carried by one end of the belt and adapted to cooperate with the opposite end 21 of the belt for fastening same together in any desired relationship whereby to snugly engage the sealing means 14C inside of the garment in the region of the belt 16 with the torso of a wearer of the garment 10.

The heat-producing means, in the specific example illustrated in FIGS. 1–4, comprises a flat thin-sheet base member 22 of electrical insulating material and a similar cover member 23 of electrical insulating material joined together (adhesively, cohesively, or otherwise) along the junction line indicated at 24 and provided therebetween with heating element means 25 which comprises a tortuous path, electrically resistive wire or ribbon provided with input means 26 extending beyond the joined base and cover members 22 and 23 and being in electrically conductive relationship with respect to connection means 27 adapted to be controllably connected to electric power supply means, which in the specific form of the invention illustrated in FIGS. 1–4 (and shown enlarged in FIGS. 6 and 7), comprises the battery means, indicated generally at 28, for electrically energizing the heating element means 25.

In the specific form of the invention illustrated in FIGS. 1–4, 6 and 7, this energization is accomplished through the controllably adjustable thermostatic switch means, indicated generally at 29, which is positioned within the torso or trunk covering and enclosing garment means 10 adjacent to the wearer's body and which is electrically connected in series with said electric power supply means 28 and said heat-producing heating element 25. The thermostatic switch means 29 is so arranged as to be operable in a circuit-breaking or circuit-opening direction at a controllably adjustable upper control temperature such as, for example, somewhere in the neighborhood of 70 degrees, and so as to be operable in a circuit-closing manner at a controllably adjustable lower control temperature such as somewhere in the neighborhood of 60 degrees whereby to maintain the temperature in the heated interior 18 within a predetermined minimum-to-maximum range. Adjustment of the control temperature range of the thermostat 29 is accomplished by the adjusting knob 30 in a conventional manner which is not thought to require explanation in detail since such arrangements are well known in the art.

In the specific example illustrated, the joined base member 22 and cover member 23 of the heat-producing means 12 are fastened (adhesively, cohesively, or otherwise) to the outer surface of the inner liner 13 between said inner liner and the outer insulating member 11, with additional thermal insulation material 31 positioned therebetween whereby to minimize heat loss from the heated interior 18 so that the thermostatic switch means 29 will effectively maintain the circuit to the heat-producing means 12 in open condition for a very substantial period of time when the heated garment is being used so as to minimize current drain on the power supply means 28.

Figure 5:
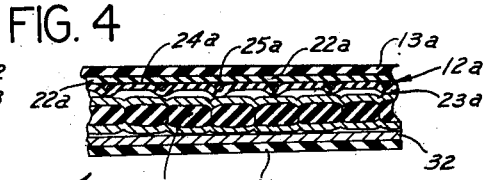
FIG. 5 is an enlarged fragmentary sectional view generally similar to a portion of FIG. 3, but illustrating a slightly modified form thereof including an additional, effectively inwardly directed radiant-energy-reflecting type of insulator means in addition to the insulator means of a type adapted to inhibit thermal conduction therethrough.

This heat loss prevention feature of the present invention is extremely important and can be further enhanced by the provision of an additional type of insulating means such as is illustrated in FIG. 5 comprising an inwardly directed heat-reflecting means 32 adapted to reflect radiant heat energy inwardly. This type of heat-reflecting means acts very much like a mirror and is usually made of thin metallic material of a flexible nature (sometimes of woven metallic fiber and other times of formed or deposited thin metallic film form) and of a specular nature capable of reflecting radiant heat inwardly so as to retain heat within the closed and sealed heated garment. One such material is known in the trade as "milium" and is made of aluminum material formed in the manner indicated above. The use of this type of radiant-energy-reflecting insulator 32, in addition to the insulating material 31a, which is of a type inhibiting heat loss by thermal conduction, provides a very effective composite heat-retaining means for the heated garment of the present invention, which further minimizes current drain on the electric power supply means.

Parts similar to those illustrated in the first form of the invention are indicated by similar reference numerals, followed by the letter "a," however.

The preferred form of the invention illustrated in FIGS. 1–4, 6 and 7, includes means for supporting the electric power supply means 28, said means comprising support loop means 33 carried by the belt 16 and fastened to each of the two batteries 28 comprising the electric power supply means in this form of the invention.

It should be noted that the base and cover members 22 and 23 of the heat-producing means 12 are preferably made of liquid-impervious material, such as certain of the flexible thin-sheet plastic materials like polyvinyl resin, or the like, whereby to prevent moisture from entering the interior of the heat-producing means 12 and possibly shorting out various portions of the heating element means 25.

It should be noted that the garment indicated at 10 is normally adapted to be worn as a garment underneath an outer covering garment such as a windbreaker, jacket, coat, parka, or the like, although not necessarily specifically so limited. In the event that it is to be worn as an outer garment, it may be provided with sleeves and suitable sealing means at the wrists, if desired.

Figure 7:
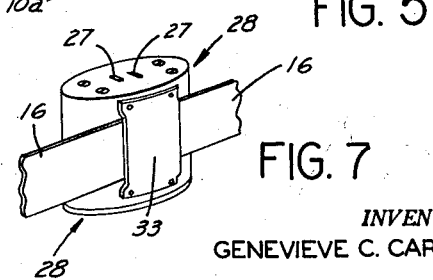
FIG. 7 is a perspective view from the rear of the power supply means shown in FIG. 6 and illustrates the mode of attachment thereof to the belt.

FIGS. 6–8 illustrate the detail of a typical battery comprising the power supply means in the first form of the invention. It will be noted that this battery is of a storage battery type adapted to be recharged from a conventional 110–120 A.C. power line by merely plugging it into an A.C. outlet through a controllably engageable and disengageable adapter, such as is indicated at 38 in FIG. 8, which includes appropriate rectifier means and, if needed, input transformer means or various other voltage and/or current modification and/or control means, as needed. This is not shown in detail since such arrangements are well known in the art. This means that a user of the apparatus of the present invention would normally have a spare battery which has been plugged through the adapter means 38 into an A.C. outlet and has been fully charged, so that, when the battery in the heated garment of the present invention becomes discharged to a point that it is no longer effective for heating purposes, the user may merely remove it and replace it with the fully charged battery. When this is done, the adapter means 38 will be placed between the discharged battery and the A.C. outlet whereby it will be fully charged and ready for use when it is next needed.

FIG. 9 illustrates, in electrical schematic form, the connection of the two power supply means 28, through the connection means 27, the input leads 26, and the controllably adjustable thermostatic switch means 29, to the heating element means 25. It should be noted that an additional lead L connects the two batteries 28 in series and extends around and across the inside of the back of the garment 10 above the level of the belt 16 thereof. However, various other arrangements may be employed including having the heating element 25 in separable portions, each series-connected to its own battery 28, or in various other electrically connected arrangements.

FIGS. 10 and 11 illustrate a slight modification of the invention wherein the flexible torso or trunk-covering or trunk-enclosing means indicated generally at 10a in FIG. 10 is substantially identical in all respects to that indicated by the reference numeral 10 in the first form of the invention illustrated in FIGS. 1–4, and similar reference numerals, followed by the letter "b," however, indicate similar parts, which, because of their similarity, are not believed to require a repetitious, full, and complete description thereof since such a description would be redundant.

However, in this modification, the electric power supply means, indicated generally at 28b, takes a slightly different form from that indicated at 28 in the first form of the invention illustrated in FIGS. 1–4. This is illustrated in somewhat enlarged form with respect to one of the modified power supply means 28b in FIG. 11, wherein it is shown to comprise what is known as a "fuel cell," which actually is an electrochemical device for producing electricity as a result of electrochemical action involving two dissimilar materials (such as fuel and a source of oxygen). The principle is quite similar to a battery except that the two dissimilar materials in a battery are initially present in the entire quantity which will be used through the entire useful working life of the battery.

However, in the "fuel cell" illustrated at 28b in FIGS. 10 and 11, the materials involved in the electrochemical action are continuously supplied to the "fuel cell" center chamber 39 from hollow pressure vessels 40 and 41 through input connections 42 and 43.

While the pressure vessels 40 and 41 may carry various different materials adapted for use in a "fuel cell," for illustrative purposes only and not in a limiting sense, it is pointed out that the pressure vessel 40 might contain oxygen under pressure while the pressure vessel 41 might contain hydrogen under pressure. These are exemplary only since various materials capable of combustion together may be employed and have been so employed in various fuel cells well-known in the art. However, for purposes of illustration, the oxygen and hydrogen form of the invention is quite adequate to impart an understanding of the principle involved. The oxygen enters the central chamber 39 through inlet 42 adjacent the electrode 44 which may comprise a piece of nickel screen or the like, although not specifically so limited. The hydrogen enters the intermediate or central chamber 39 through the inlet 43 closely adjacent to the other electrode 45, which may also be a nickel electrode of fine wire screen construction, although not specifically so limited.

The electrodes 44 and 45 are usually coated with a suitable catalyst such as platinum black, although not specifically so limited, and are immersed in the electrolyte 46 which may comprise potassium hydroxide, or the like, although not specifically so limited.

An intervening ion exchange wall or the like may be provided, as indicated in broken lines at 47, or in certain forms of the invention, may be eliminated entirely.

The oxygen molecules are disassociated at the electrode 44, which effectively comprises an interior cathode, into atomic oxygen, while the hydrogen molecules are disassociated into atomic hydrogen at the electrode 45, which effectively comprises an interior anode. This action in the electrolyte 46 is facilitated by the catalyst such as platinum black, or the like, carried by the two electrodes 44 and 45, and results in the cathode 44 and the anode 45 exchanging charges through the electrolyte by ion movement, negatively charged hydroxyl (OH—) ions, therethrough from cathode to anode in a manner such that the external circuit connected to the two electrodes 44 and 45 will have electron flow therethrough from electrode 45 to electrode 44 in accordance with the electromotive force produced across the electrodes.

Each of the pressure vessels 40 and 41 is adapted to be recharged with oxygen and hydrogen through normally closed input connections 48.

The oxygen and hydrogen combine as a result of the above-described operation to form a much smaller volume of water, which will ultimately dilute the electrolyte 46, which can be drained and replaced after long periods of operation through suitable drain means such as that indicated at 49 in FIG. 11, although not specifically so limited.

It should be clearly noted that FIG. 11 illustrates an arrangement which appears to include only one fuel cell. This is done for drawing simplification purposes and in order to make it possible to readily explain the operation thereof as has been done hereinabove. However, in actual practice, it should be noted that normally the power supply means 28b would include a number of such fuel cells (which are normally very small) all connected in series whereby to provide an output voltage of the desired amount for effective cooperation with the heat-producing means indicated generally at 12b in FIG. 10.

FIG. 12 illustrates a slightly modified version of the invention wherein it comprises a heated garment, indicated generally at 10c, for an animal torso, such as for a dog torso, or the like. In this modification of the invention, similar or corresponding parts are indicated by similar reference numerals, followed by "c," however. It is not believed necessary to describe all of the elements of this modification of the invention in detail since they are basically similar to those already described in detail in connection with the first form of the invention indicated in FIGS. 1-4. However, in this modification, it should be noted that there is no belt corresponding to that shown in the first form of the invention. Furthermore, in this modification, the means for supporting the electric power supply means comprises a single pocket 33c carried on the outside of the garment 10c in a location lying over the dog's dorsal region, and it is provided with appropriate snap fasteners 50 for controlling the opening and closing of same. Also, alternatively or additionally, the heated garment 10c may be provided with fastening means comprising the multiple strap portions 51 and 52 with each of the strap portions 51 being provided with buckle means 53 cooperable with the opposed strap portion 52 for controllably adjustable fastening engagement with respect thereto for firmly fastening the heated garment 10c around the torso of a dog or other animal. It should be noted that the heated animal blanket form of the invention has sealing means similar to the first form of the invention previously described and illustrated in detail in FIGS. 1-4. Other portions of the heated animal blanket form of the invention are basically similar to the corresponding elements of the first form of the invention and further detailed description is thought to be redundant.

It should be noted that the outer insulating member may be made of various materials which comprise effective thermal insulators and/or which, in certain cases, may be liquid-impervious, and that the inner liner may also be made of various suitable materials, either plastic or fabric. The insulating material may be of a type comprising a cellular material having a very substantial percentage of hollow cells therein, such as polyurethane foam, sponge rubber, or various other similar materials, or may be made of flocked or finely divided particles or strands of insulating material such as Dacron down (usually quilted), or the like, separated by air spaces or any other suitable insulating material.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. An electrically heated torso covering garment, comprising: flexible torso covering means including outer flexible insulating means provided adjacent the inner side thereof with electrically energizable heat-producing means; and electric power supply means and means for electrically connecting same to said heat-producing means for electrically energizing same; said torso covering means being provided with a plurality of individual, separate, continuous, inwardly projecting, elastically compressible, air-impervious sealing edge portions defining a plurality of individual, separate, complete closed-loop exit apertures for a plurality of different extended torso portions of a body passing through and extending substantially beyond said complete closed-loop exit apertures; each of said complete closed-loop exit apertures being provided with a corresponding one of said continuous, elastically compressible, air-impervious sealing edge portions extending inwardly therefrom completely around the inner periphery of said exit aperture whereby to define a continuous, closed-loop inwardly extending, air-flow-preventing gasket means effectively comprising said exit aperture; said continuous, closed-loop, inwardly extending, air-flow-preventing gasket means being cooperable for forcible elastic air-flow-preventing engagement with a corresponding different one of said extended torso portions whereby to inhibit heat loss through said exit aperture from the interior of the heated torso covering means.

2. A garment of the character defined in claim 1, including an inner flexible liner means positioned immediately inside of said heat-producing means and being substantially coextensive with said outer insulating means and being joined thereto to define said torso covering means.

3. A garment of the character defined in claim 1, wherein said torso covering means is provided with fastening means for fastening same in sealed covering relationship around at least a portion of a torso.

4. A garment of the character defined in claim 1, wherein said outer insulating means comprises inwardly directed heat-reflecting means.

5. A garment of the character defined in claim 1, wherein said torso covering means is provided with support means for removably carrying said electric power supply means.

6. A garment of the character defined in claim 1, including thermostatic switch means carried by the torso covering means in thermal communication with the interior thereof and electrically connected in circuit with said electric power supply means and said heat-producing means and operable in a circuit-breaking manner at an upper control temperature and operable in a circuit-closing manner at a lower control temperature whereby to maintain the temperature within the torso covering means around at least a portion of a torso within a predetermined minimum-to-maximum temperature range.

7. A garment of the character defined in claim 1, wherein said electric power supply means comprises fuel cell means for producing electric power as a result of oxidation of fuel.

8. A garment of the character defined in claim 1, wherein said heat-producing means comprises a flat thin-sheet base member of electrically insulating material and a similar cover member of electrically insulating material adhesively joined together and provided therebetween in adhesively centrally mounted location with heating element means comprising tortuous path, electrically resistive means provided with input means extending beyond the joined base and cover members and in electrically conductive relationship with said connection means for connection to said electric power supply means.

9. A garment of the character defined in claim 8, wherein said base and cover members are of liquid-impervious material.

10. An electrically heated garment comprising flexible torso covering means including outer flexible insulating means provided adjacent the inner side thereof with electrically energizable heat-producing means; said torso covering means being provided with a plurality of individual, separate, continuous, inwardly projecting, elastically compressible, air-impervious sealing edge portions defining a plurality of individual, separate, complete closed-loop exit apertures for a plurality of different extended torso portions of a body passing through and extending substantially beyond said complete closed-loop exit apertures; each of said complete closed-loop exit apertures being provided with a corresponding one of said continuous, elastically compressible, air-impervious sealing edge portions extending inwardly therefrom completely around the inner periphery of said exit aperture whereby to define a continuous, closed-loop inwardly extending, air-flow-preventing gasket means effectively comprising said exit aperture; said continuous, closed-loop, inwardly extending, air-flow-preventing gasket means being cooperable for forcible elastic air-flow-preventing engagement with a corresponding different one of said extended torso portions whereby to inhibit heat loss through said exit aperture from the interior of the heated torso covering means.

11. A garment of the character defined in claim 10, including an inner flexible liner means positioned immediately inside of said heat-producing means and being substantially coextensive with said outer insulating means and being joined thereto to define said torso covering means.

12. A garment of the character defined in claim 10, wherein said torso covering means is provided with fastening means for fastening same in sealed covering relationship around at least a portion of a torso.

13. A garment of the character defined in claim 10, wherein said outer insulating means comprises inwardly directed heat-reflecting means.

14. A garment of the character defined in claim 10, including flexible means encompassing said heat-producing means.

15. A garment of the character defined in claim 10, including said torso covering means is provided with support means for removably carrying an electric power supply means.

References Cited in the file of this patent

UNITED STATES PATENTS

| | | |
|---|---|---|
| 1,691,472 | Graham et al. | Nov. 13, 1928 |
| 2,028,889 | Baddour | Jan. 28, 1936 |
| 2,329,766 | Jacobsen | Sept. 21, 1943 |
| 2,458,119 | Van Daam | Jan. 4, 1949 |
| 2,570,376 | Quist | Oct. 9, 1951 |
| 2,579,383 | Goudsmit | Dec. 18, 1951 |
| 2,584,302 | Stein | Feb. 5, 1952 |
| 2,617,916 | Niedwig | Nov. 11, 1952 |
| 2,618,257 | Berkman | Nov. 18, 1952 |
| 2,652,824 | Hopp | Sept. 22, 1953 |
| 2,692,326 | Crowell | Oct. 19, 1954 |
| 2,870,824 | La Barre | Jan. 27, 1959 |
| 2,889,445 | Wolf | June 2, 1959 |
| 2,948,802 | Shaw | Aug. 9, 1960 |